US005747799A

United States Patent [19]

Franzen

[11] Patent Number: 5,747,799

[45] Date of Patent: May 5, 1998

[54] METHOD AND DEVICE FOR THE INTRODUCTION OF IONS INTO THE GAS STREAM OF AN APERTURE TO A MASS SPECTROMETER

[75] Inventor: Jochen Franzen, Bremen, Germany

[73] Assignee: Bruker-Franzen Analytik GmbH, Bremen, Germany

[21] Appl. No.: 656,893

[22] Filed: May 30, 1996

[30] Foreign Application Priority Data

Jun. 2, 1995 [DE] Germany ........................ 195 20 276.7

[51] Int. Cl.[6] ............................ B01D 59/44; H01J 49/00

[52] U.S. Cl. ............................................ 250/288; 250/282

[58] Field of Search .................................... 250/281, 282, 250/288

[56] References Cited

U.S. PATENT DOCUMENTS

| | | | |
|---|---|---|---|
| 4,542,293 | 9/1985 | Fenn et al. | 250/288 |
| 4,963,735 | 10/1990 | Okamoto et al. | 250/288 |
| 5,103,093 | 4/1992 | Sakairi et al. | 250/288 |
| 5,148,021 | 9/1992 | Okamoto et al. | 250/288 |
| 5,298,743 | 3/1994 | Kato | 250/288 |
| 5,304,798 | 4/1994 | Tomany et al. | 250/288 |
| 5,432,343 | 7/1995 | Gulcicek et al. | 250/288 |
| 5,523,566 | 6/1996 | Fuerstenau et al. | 250/288 |

FOREIGN PATENT DOCUMENTS

| | | |
|---|---|---|
| 4303027 | 2/1992 | Germany . |
| 1584459 | 2/1981 | United Kingdom . |
| 2256525 | 12/1992 | United Kingdom . |
| 8912313 | 6/1989 | WIPO . |
| 9523018 | 2/1995 | WIPO . |

*Primary Examiner*—Bruce Anderson

[57] ABSTRACT

The invention relates to methods and devices for the efficient threading in of ions, which have been generated in a gas volume, into the suctioning air stream of an aperture, the diameter of which is small in comparison to the extent of the gas volume. The aperture can be an introductory aperture for ions into the vacuum system of a mass spectrometer, or however the end aperture of a capillary which transfers ions into the vacuum of the mass spectrometer. The invention consists of an electrical drawing field for generating the ions, the lines of force of which point to the edge of the aperture or into the aperture itself and allow the ions, directed by the field, to migrate through the ambient gas to the aperture. The field-guided migration of the ions through the gas is known as "ion mobility". Near the aperture, the ions are caught by the suctioning gas stream and entrained into the aperture by viscous friction. Due to the field-guided migration, the ions can be transferred in this way from a zone with a complex gas mixture into one with a pure gas.

14 Claims, 2 Drawing Sheets

METHOD AND DEVICE FOR THE INTRODUCTION OF IONS INTO THE GAS STREAM OF AN APERTURE TO A MASS SPECTROMETER

The invention relates to methods and devices for the efficient introduction of ions which have been generated in an extended gas cloud, into the suctioning air stream of an inlet aperture, the diameter of which is small in comparison to the extent of the gas cloud. The inlet aperture can be a wall aperture of a vacuum system containing a mass spectrometer, or the end aperture of a capillary which transfers ions into the vacuum of the mass spectrometer.

The invention consists of an electrical drawing field for the ions, the lines of force of which point to the edge of the aperture or into the aperture itself and allows the ions, directed by the field, to migrate to the aperture through the ambient gas. The field-guided migration of the ions through the gas is known as "ion mobility". Near the aperture, the ions are caught by the suctioning gas stream and are then guided into the aperture by viscous friction of the gas. Due to the field-guided migration, the ions can be transferred from a zone with a complex gas mixture into one with a pure gas.

PRIOR ART

Substance ions for mass spectrometric analysis can be generated to advantage outside the mass spectrometer and transferred into the vacuum of the mass spectrometer. On the one hand, there are advantages in a much higher ionization yield than for ionization in a vacuum, on the other hand in a more greatly reduced contamination of the mass spectrometer, since the substance vapors need not be introduced into the vacuum system. Mass spectrometers and substance inlet systems therefore no longer need to be heated and periodically cleaned in a complicated manner.

Among vacuum-external ion sources, for example, there is the electrospray ionization (ESI), with which substances of extremely high molecular weight can be ionized with a high yield. Also ion sources with ion generation in inductively coupled plasma (ICP), used for inorganic analysis, belong to this group. Finally there is the chemical ionization of molecules at atmospheric pressure by means of various types of reactant gas ions (APCI), with a primary ionization of the reactant gases by corona discharges, by using UV lamps or by beta emitters, which are used for the analysis of pollutants or other vaporous substances found in the air. The development of further types of external ion sources is under way.

The externally generated ions are brought into the vacuum either through minute wall apertures of 30 to 300 micrometers in diameter or through capillaries with 300 to 500 micrometers inside diameter. Common to both types of introduction is that large amounts of ambient gas enter into the vacuum of the mass spectrometer at the same time with the ions, which are viscously entrained by the ambient gas and are thus led from the vacuum-external region through the inlet aperture into the vacuum system.

As long as the amount of gas drawn in is large, and sufficient ions are taken along into the vacuum, this simple method of feeding ions to the aperture is satisfactory. For electrospray as well as for ICP, apertures were previously used without any special ion guidance directed pointedly to the inlet aperture. It must nevertheless be expected, simply for reasons of pump capacities and the prices of large pump systems, that even more minute apertures of 5 to 30 micrometers diameter or smaller capillaries with 10 to 300 micrometers inside diameter will be used in the future. In this way, much less gas is drawn in. The ions must therefore be fed to the aperture precisely. Also for ionization methods which generate a relatively reduced ion density, it would be advantageous to be able to comb out the ions from the gas volume and, independent of the gas transport to the entrance, to transport them to the aperture of the mass spectrometer.

For guidance of the ions after their entrance into the vacuum system all the way to the mass spectrometer, stationary lens systems as well as RF multipole based ion guides have become known. However, outside of the vacuum, no particular pointed guidance system for the ions has been developed until now.

OBJECTIVE OF THE INVENTION

It is the objective of the invention to find methods and devices with which ions can be fed precisely from a larger gas cloud into a minute inlet aperture leading into a vacuum system. It is a further objective of the invention to increase the density of the ions in the flowing gas compared with that in the gas cloud. A further objective of the invention consists of transferring the ions from the dirty gas mixture cloud in which they were generated into a pure gas, so that only the pure gas and the ions enter the vacuum.

IDEA OF THE INVENTION

It is the idea of the invention to allow the ions in the gas to migrate by means of electrostatic fields pointedly towards the edge of the input aperture of the vacuum system. This process of field-induced migration of ions through gas is known per se, and has been analyzed relatively well under the concept of ion mobility.

The ions do not move according to ion-optical laws, such as are valid for the movement of ions in electrical field arrangements in a vacuum. For movement in a vacuum, the mass of the ions and the influence of inertia on the movement play a prominent role. In gases, on the other hand, the migration of the ions is constantly impeded by continuous collisions with the gas molecules; the ions therefore exactly follow the electric field lines (force field), which are perpendicular to the equipotential surfaces, in a slow diffusion-like movement.

Due to the different motion laws, a favorable configuration of electrical fields for feeding the ions cannot be determined by the widely available computation programs for ion-optical trajectories in vacuum (for example the well-known SIMION program).

The basic idea of the invention therefore specifically consists of generating an electrical field in which the electrical field lines lead from the ion-containing gas cloud towards the edge of the aperture to the vacuum system or —even better—into the aperture itself. In this way, the ions migrate from the gas volume towards the edge of the aperture due to their ion mobility. Near the aperture—or in the aperture—they are then caught by the suction stream of the gas and viscously entrained into the vacuum.

The field lines can be focused simplest on the edge of the aperture if the aperture takes the form of an annular cutting edge, meaning the outer edge of the aperture takes the form of a protruding cone with the aperture at its tip. This embodiment is optimal if the surrounding area of the aperture is electrically conductive, for example, if the aperture is located in a metal wall. At a distance from the cone tip, a radial field thereby forms which points to the cone tip. It is therefore a basic idea of the invention to arrange the aperture to the vacuum at the tip of a cone and to allow the ions to migrate into this radial field until close to the aperture. Right next to the aperture, the ions are guided by the electrical field to the annular cutting edge of the aperture, but are however deflected by the suctioning air stream and taken into the aperture. Right next to the aperture, the velocity of gas moving into the aperture increases to such an extent that the ions are caught by the increasing gas velocity and guided viscously into the aperture.

The annular cutting edge should not be completely sharp, since the field strength in front of the cutting edge is a reciprocal of the radius of the cutting edge. Therefore, with a very sharp cutting edge, greater potential is necessary in order to generate the same field distribution in the outer chamber. Additionally, ions which are located right in front of the cutting edge can no longer be pulled away by the gas stream from the cutting edge into the aperture. It is therefore favorable to blunt the cutting edge by giving it a small radius. The radius should be somewhere between one eighth and one half of the aperture radius. Such rounding off of the cutting edge also improves gas intake into the aperture. In the case of a capillary, laminar flow is more easily achieved within the capillary.

The radial field around the cone can thereby take a favorable form through other cone-shaped or flush aperture diaphragms in front of the inlet aperture.

For the introduction of ions into an inlet aperture in an isolating material, for example glass or silica glass, there is an even better type of ion guidance. The ring electrode, where the lines of electric force end, can be attached here on the inside of the duct in the aperture. The lines of electric force partially lead through the material at the start of ion introduction. Through surface charges which cannot drain away, a force field forms after a very brief time that leads into the aperture through to the ring electrode without any more cutting through the wall material. The continuing viscous entrainment of the ions is easier here since the maximum gas velocity has already almost been reached at the ring electrode. Also in this case the field outside the aperture can be favorably formed by aperture diaphragms in front of the aperture.

It is a further basic idea of the invention to allow a pure gas to flow between the aperture and the aperture diaphragms arranged in front of it. As long as the flow speed of the gas away from the aperture is much lower than the migration velocity of the ions, the ions migrate into this pure gas and only this pure gas is fed into the mass spectrometer.

DESCRIPTION OF THE FIGURES

Figure 1:
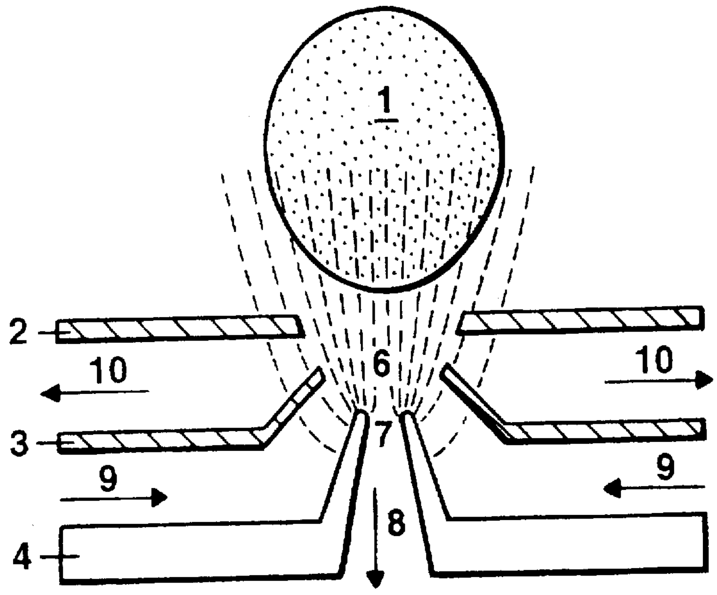
FIG. 1 is a schematic view of an ion introduction device according to the present invention.

FIG. 1 shows an example with an aperture in a conductive material. An ion-containing Gas Cloud (1) is located before an Inlet Aperture (7) in a Wall (4) of a mass spectrometer, with a conically shaped Aperture Diaphragm (3) and a flush Aperture Diaphragm (2) in front of the Inlet Aperture (7). The Inlet Aperture (7) is bordered by a conically shaped annular cutting edge. The annular cutting edge is not sharp, but slightly rounded in order to prevent the electrical field density (and therefore the potential differences) from becoming too great. The Gas Stream (8) flows through the Inlet Aperture (7) into the mass spectrometer. Through suitable potentials at the annular cutting edge and on the Aperture Diaphragms (3) and (2), the Electric Force Field (6) is formed. The ions migrate from the Gas Volume (1) along the lines of the Electrical Force Field (6) onto the annular cutting edge around the Inlet Aperture (7). Near the aperture they are pulled into the Inlet Aperture (7) by the Gas Stream (8). A pure Gas Stream (9), which is fed between the Wall (4) and Aperture Diaphragm (3) prevents passage of gas from the Gas Cloud (1) to the Inlet Aperture (7). An excess of the Gas Stream (9), not entering the Inlet Aperture (7), flows as Gas Stream (10) between the Aperture Diaphragms (3) and (4).

Figure 2:
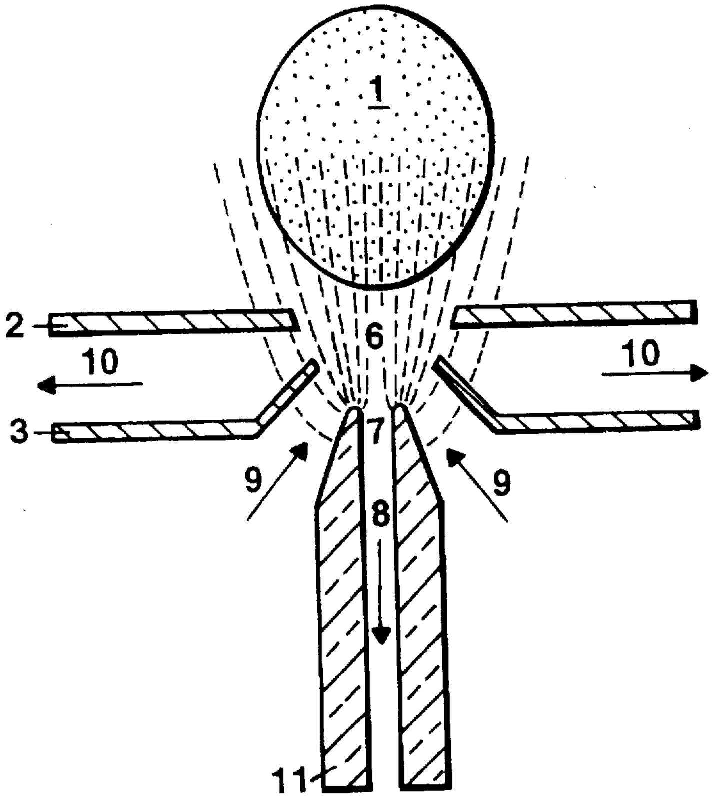
FIG. 2 is a schematic view of an introduction device similar to that of FIG. 1, but in which the inlet aperture leads to an inlet capillary.

FIG. 2 shows an arrangement as in FIG. 1, however the Inlet Aperture (7) leads into the an Inlet Capillary (11) instead of through the Wall (4) of the vacuum system.

Figure 3:
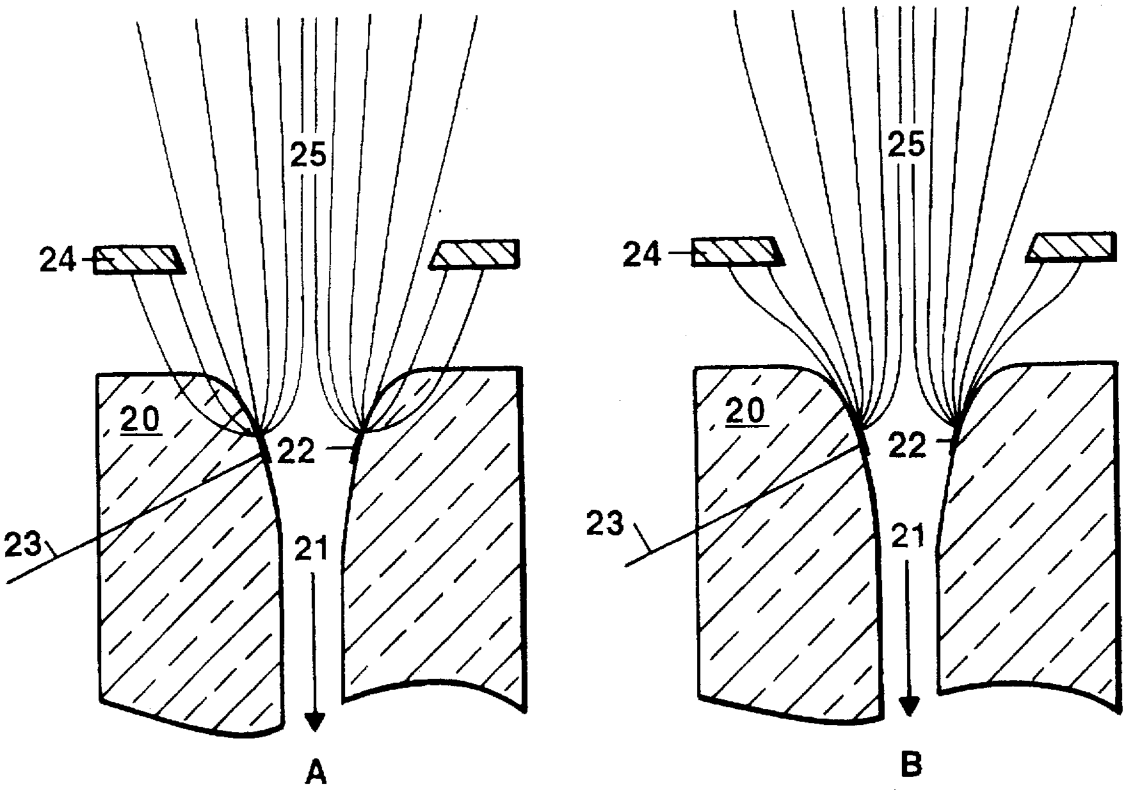
FIG. 3 is a schematic view of a glass capillary into which ions are introduced, the figure demonstrating the electrical field lines leading to the capillary under different conditions.

FIG. 3 shows the introduction of ions into a glass capillary. Only the end head of the Glass Capillary (20) is shown. The Glass Capillary (20) has a rounded, funnel-shaped inlet in order to ease the formation of laminar Gas Flow (21). Almost at the end of the funnel-shaped inlet, a metallic Ring Electrode (22) is attached. This is provided with a potential by a Feeder (23) which leads through the Glass Capillary (20), creating the electrical field (25). In front of the inlet aperture there is another Aperture Diaphragm (24). The electrical field lines cut through the glass material before the arrival of the first ions, as shown in Part A of FIG. 3. As soon as the introduction of ions begins, the ions migrate along the Lines of Force (25) onto the glass surface and build up a charge layer there which cannot be discharged. Supply of ions to this layer is continued for so long until a charge constellation is achieved by which the lines of force no longer cut through the glass. The lines of force now lead through the aperture to the ring electrode, as shown in Part B of FIG. 2, ideal for the introduction of ions into the capillary. The ideal force field is self-maintaining. As soon as surface charges begin to discharge, the surface charge is renewed by other ions.

Figure 4:
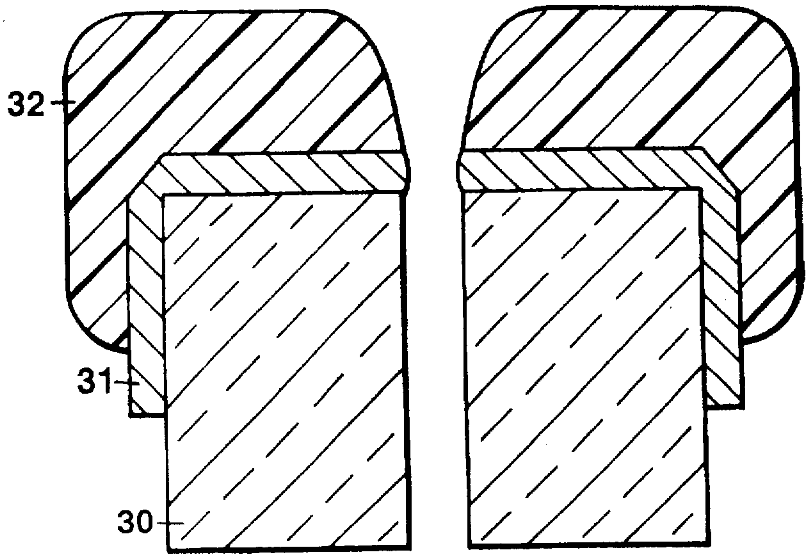
FIG. 4 is a schematic view of a capillary head with a ring electrode according to the present invention.

FIG. 4 shows the design of a capillary head with ring electrode according to FIG. 3 in a very simple sandwich design. Coaxially, a metal Electrode Ring Cap (31) is glued on a thick-walled Glass Capillary (30). On this Electrode Ring Cap (31), an electrically insulating Ring Cap (32) is attached with a favorably designed inlet path. This Ring Cap (32) can be manufactured from glass or plastic.

PARTICULARLY FAVORABLE EMBODIMENTS

A particularly favorable embodiment, which can also be easily manufactured, is shown in FIG. 4. It relates to the inlet of ions into a capillary. A similar arrangement with a covering isolator disk can however also be selected for the aperture in a vacuum wall.

Here, on the blunt end of a thick-walled Glass Capillary (30), a thin-walled Metal Ring Cap (31) is glued which can easily be supplied with voltage on the exposed side wall. This metal ring cap is covered by an isolating Ring Cap (32), which has a rounded inlet funnel in the center for the inflowing gas. The isolating ring cap can be particularly favorably made from Teflon, since Teflon has almost no electrical surface conductivity, even with high air humidity.

The lines of electric force, which are emitted when applying a voltage from the metal ring cap, first flow through the Teflon cap similar to that shown schematically in the arrangement in FIG. 3A. If the lines of force then attract ions which are generated in the outer region, the ions also move toward the Teflon cap first. They settle there on the surface. Their charge thereby creates an electrical field which superimposes the prevailing electrical field and prevents the continuing inflow of ions due to saturation. The lines of electric force then appear to be displaced out of the Teflon cap; they now run from the exposed metal ring cap inside of the inlet aperture only through the inlet funnel, similar to that shown schematically in FIG. 3B.

The gas flowing through the inlet aperture into the vacuum has already reached its maximum velocity at the metal ring cap. The ions are therefore viscously entrained for the most part by the gas current and transferred through the capillary into the vacuum.

The electrical field can be favorably formed in the chamber in front of the inlet aperture by coaxially arranged conical or flush Aperture Diaphragms (2,3). The potentials to be applied to the aperture diaphragms are best determined experimentally, by allowing a maximum ion introduction into the capillary. This can be easily determined with the detector of the internal mass spectrometer.

Using insulating Aperture Diaphragms (2,3) avoids even the installation of additional power supplies. Charging up the surface of the diaphragms automatically leads to an optimum guidance field.

If the gas volume in which the ions are generated is heavily enriched with substances, the introduction of which into the vacuum system of the mass spectrometer should be avoided if possible. The ions should be transferred according first into a pure gas stream. To do this, a pure Gas (9) is fed between the entrance aperture and the first apertured diaphragm. The flow amount of this gas must be adjusted in such a way that only this gas flows into the inlet aperture. The guidance of this gas can be supported by the design of the first apertured diaphragm. Flow of the gas through the apertured diaphragm toward the outside must then have a more reduced velocity than that which corresponds to the ion mobility velocity of the heaviest ions.

The excess Gas Stream (10) toward the outside can also be evacuated through the intermediate area between the first and second apertured diaphragms, as shown in FIGS. 1 and 2.

It is also possible to feed the pure gas between the first and second apertured diaphragms, and evacuate the excess between the inlet aperture and the first apertured diaphragm. The gas flow is then more favorable for ion guidance, but it is then easier for gas from the contaminated gas flow to pass into the inlet aperture.

I claim:

1. Method for the transfer of ions from a vacuum-external gas cloud into a minute inlet aperture of an evacuated mass spectrometer, the method comprising:

providing vacuum-external guidance to the ions with an electrostatic field generated by a ring-shaped electrode, the electrode having an ion-drawing potential and being arranged around the inlet aperture such that field lines of an electrostatic guidance field between the gas cloud and the inlet aperture are primarily concentrated on the ring-shaped electrode.

2. Method as in claim 1, wherein providing vacuum-external guidance to the ions comprises providing vacuum-external guidance to the ions using a ring-shaped electrode with an electrically conductive annular cutting edge which forms the edge of the entrance aperture.

3. Method as in claim 2, wherein providing vacuum-external guidance to the ions comprises providing vacuum-external guidance to the ions with a ring-shaped electrode having an annular cutting edge that is blunted with a cutting radius of 10 to 200 micrometers in order to prevent the field strength at the cutting edge from becoming too great.

4. Method as in claim 2, wherein providing vacuum-external guidance to the ions comprises providing vacuum-external guidance to the ions wherein said input aperture is a minute aperture of 5 to 500 micrometers diameter in a wall of the mass spectrometer.

5. Method as in claim 2, wherein providing vacuum-external guidance to the ions comprises providing vacuum-external guidance to the ions wherein said input aperture is the end aperture of an inlet capillary with an inside diameter between 5 and 1000 micrometers.

6. Method as in claim 1, wherein providing vacuum-external guidance to the ions comprises providing vacuum-external guidance to the ions using a ring electrode that is located on the inside wall of a capillary near the inlet aperture, the capillary being non-conductive in the vicinity of the inlet aperture.

7. Method as in claim 6, wherein providing vacuum-external guidance to the ions comprises providing vacuum-external guidance to the ions with a ring electrode that is located at the bottom of a rounded, funnel-shaped inlet path into the capillary.

8. Method as in claim 1, wherein providing vacuum-external guidance to the ions comprises providing vacuum-external guidance to the ions wherein conical or flush apertured diaphragms are arranged in front of the inlet aperture for the formation of the electrical field.

9. Method as in claim 8 further comprising feeding a pure gas in such a way between the inlet aperture and the first apertured diaphragm, or between other apertured diaphragms, that only pure gas passes into the inlet aperture together with the ions.

10. Method as in claim 1 further comprising applying a potential of 100 to 10,000 volts relative to the potential of the ion-containing gas cloud to the ring electrode of the inlet aperture.

11. Ion inlet apparatus for the transportation of ions from a vacuum-external gas cloud into the vacuum system of a mass spectrometer, containing a capillary and a voltage supply, the apparatus comprising:

a conductive ring-shaped electrode located on the outside of the mass spectrometer through which the ions pass on the way to a funnel-shaped isolating inlet path that leads to the entrance of the capillary, the ring electrode being supplied with an ion-attracting electrical potential by connection to the voltage supply, and generating an electrostatic guidance field between the gas cloud and the inlet aperture which has field lines that are primarily concentrated on the ring-shaped electrode.

12. Apparatus as in claim 11, wherein an exposed inner surface of a thin metal ring forms the ring electrode, and the thin metal ring is attached coaxially to a blunt end of the capillary, and wherein an electrically isolated ring is attached to a side of the metal ring away from the capillary and is coaxial with the metal ring about the inlet path.

13. Apparatus as in claim 12, wherein the gas inlet path has a rounded funnel shape.

14. Apparatus as in claim 12, wherein both the metal ring and the isolating ring take the form of caps.

* * * * *